US008375415B2

(12) United States Patent
Waight et al.

(10) Patent No.: US 8,375,415 B2
(45) Date of Patent: Feb. 12, 2013

(54) DYNAMIC UPSTREAM AMPLIFIER POWER MANAGEMENT

(75) Inventors: Matthew Waight, Pipersville, PA (US);
Yucheng Jin, Horsham, PA (US); Kevin T. Chang, Doylestown, PA (US)

(73) Assignee: General Instrument Corporation, Horsham, PA (US)

( * ) Notice: Subject to any disclaimer, the term of this patent is extended or adjusted under 35 U.S.C. 154(b) by 3846 days.

(21) Appl. No.: 09/811,702

(22) Filed: Mar. 19, 2001

(65) Prior Publication Data

US 2002/0133829 A1  Sep. 19, 2002

(51) Int. Cl.
*H04N 7/173* (2011.01)
(52) U.S. Cl. ..................... 725/111; 725/116; 709/219
(58) Field of Classification Search .......... 725/109–113, 725/131–134, 139–142; 370/230; 709/217–232
See application file for complete search history.

(56) References Cited

U.S. PATENT DOCUMENTS

| | | | |
|---|---|---|---|
| 4,692,919 A * | 9/1987 | West, Jr. .................. 370/239 |
| 4,996,706 A | 2/1991 | Cho | |
| 5,251,324 A * | 10/1993 | McMullan, Jr. ................ 725/14 |
| 5,379,289 A * | 1/1995 | DeSouza et al. ............. 370/230 |
| 5,606,725 A | 2/1997 | Hart | |
| 5,881,362 A | 3/1999 | Eldering et al. | |
| 6,307,429 B1 * | 10/2001 | Olgaard ........................... 330/2 |
| 6,370,153 B1 | 4/2002 | Eng | |
| 6,396,803 B2 | 5/2002 | Hornsby et al. | |
| 6,552,614 B1 * | 4/2003 | Stetson et al. ................ 330/285 |
| 6,678,893 B1 * | 1/2004 | Jung ............................ 725/111 |

* cited by examiner

*Primary Examiner* — Annan Shang
(74) *Attorney, Agent, or Firm* — Lori Anne D. Swanson

(57) ABSTRACT

The present invention is an upstream power control system, within a cable modem which controls the power consumption of the cable modem. The power control system comprises a MAC chip which synchronizes upstream communication signals for transmission to a cable network and outputs an upstream control signal, an upstream amplifier which receives the synchronized upstream communication signals, and a complex programmable logic device (CPLD). The CPLD controls the upstream amplifier in response to the upstream control signal such that the upstream amplifier is powered on during transmission of the communication signals, and powered off when not transmitting, which results in the reduction of power consumed by the cable modem.

7 Claims, 4 Drawing Sheets

DYNAMIC UPSTREAM AMPLIFIER POWER MANAGEMENT

BACKGROUND

The present invention relates to cable modems. More specifically, the present invention relates to the dynamic control of power consumption in cable modems.

Cable modems are the primary interface between a personal computer (PC) and the cable television (CATV) network. Cable modems modulate digital data from a PC for transmission over the CATV network and ultimately to the Internet, and demodulate data received over the CATV network for the PC. In recent years, the ability of CATV network operations to support additional services for transferring data, such as providing Internet access and telephone service, has led to an explosion in the demand for use of CATV networks by subscribers for information services other than standard video services. The introduction of the cable modem has given cable operators the ability to meet this demand. Since these services are typically billed at a premium, the continued penetration of the services into the existing CATV subscriber base is critical to enhancing CATV network operator revenue growth.

Until recently, cable modem providers have not been concerned with the amount of power consumed by the cable modems. Accordingly, prior art cable modems have not provided any means of power control. Recently though, customers are beginning to demand cable modems that minimize the amount of power consumed.

With respect to the operation of a cable modem, the typical data transmission profile is such that a large amount of data is downloading downstream from the Internet through the headend to the PC; and only a small amount of data is uploaded from the PC through the headend to the Internet. Further, since it typically takes a user some time to view information that is downloaded, there is a large percentage of time for which a cable modem is energized but is not actually modulating or demodulating any data. This results in a tremendous waste of electrical power.

Therefore, it is an objective of the present invention to provide a system in which the power consumption of a cable modem be dynamically controlled in order to reduce power consumption.

SUMMARY

A cable network system is disclosed wherein a content provider provides Internet Protocol (IP) information to a subscriber station over the current cable network. The network headend, coupled between the content provider and a subscriber station, sends and receives IP information to the subscriber station using a media access control (MAC) protocol. A cable modem is located at the subscriber station which implements the MAC protocol to translate and send information to the network headend.

In order to reduce the amount of power consumed by the cable modem in sending information to the network headend, an upstream power control system is inplemented. A MAC chip and a complex programmable logic device (CPLD) are utilized to implement this power control system. The upstream power amplifier is powered on and powered off when not transmitting upstream signals. The dynamic control of the upstream power amplifier reduces the amount of power consumption by the cable modem.

DETAILED DESCRIPTION OF THE PREFERRED EMBODIMENTS

Figure 1:
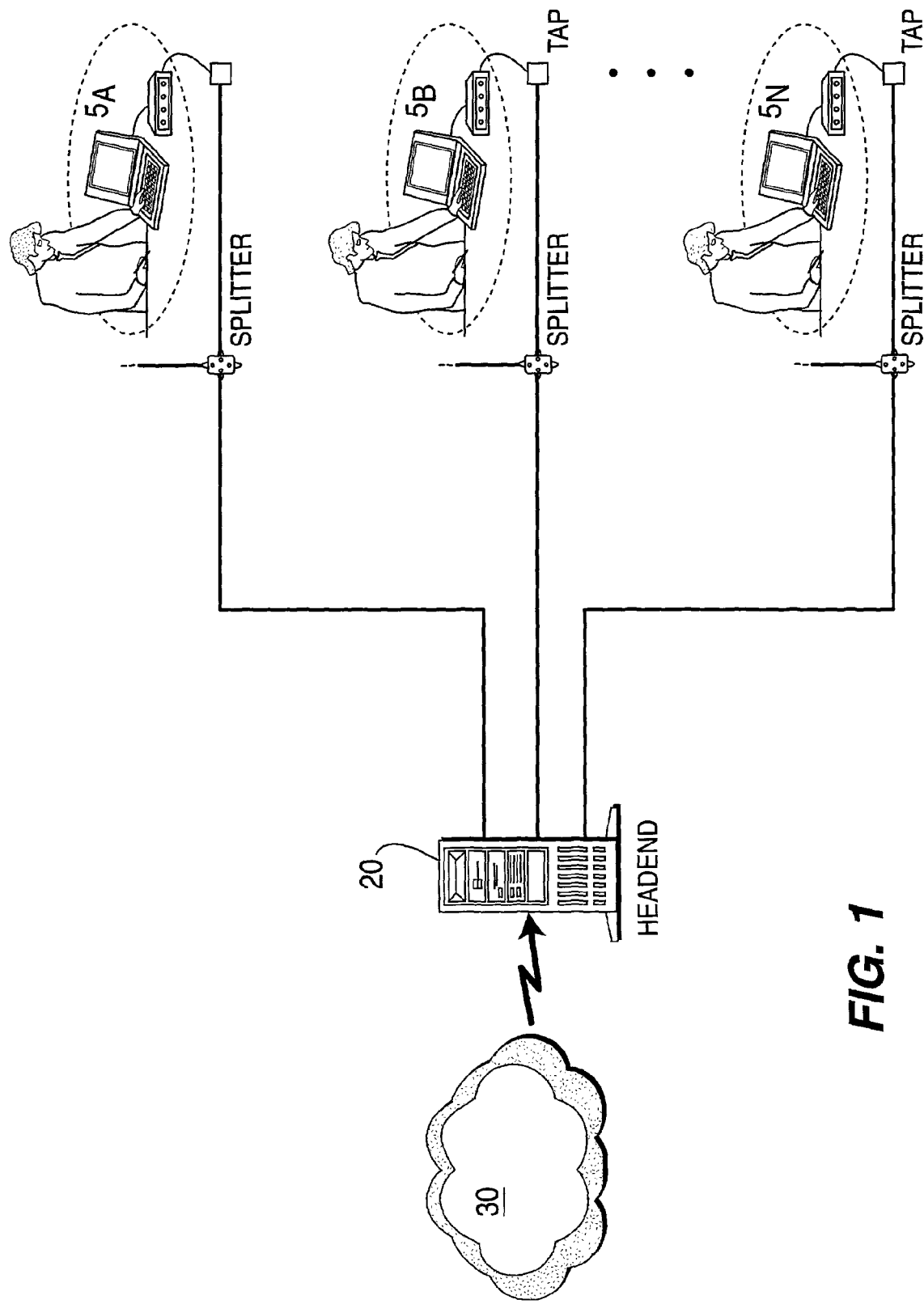
FIG. 1 is an illustration of a cable network system.

The preferred embodiments will be described with reference to the drawing figures where like numerals represent like elements throughout.

A cable network system, illustrated in FIG. 1, comprises a content provider 30, a plurality of subscriber stations $5_A$, $5_B \ldots 5_N$ and a network headend 20. The network headend 20 is coupled to both the network provider 30 and the plurality of subscriber stations 5, functioning as the communication link between the two. For purposes of this invention, the content provider 30 is a CATV network operator which provides a subscriber station 5 with Internet access over the same CATV network infrastructure serving a subscriber station 5 with CATV video and audio services.

The network headend 20 coordinates access for upstream communication from the plurality of subscriber stations $5_A$-$5_N$. As those skilled in the art should know, a media access control (MAC) protocol permits efficient sharing of the upstream channel. A basic description of the MAC protocol is as follows: A subscriber station $5_A$ transmits an information signal to notify the network headend 20 that it has information to transmit. The network headend 20 receives the request and sends an acknowledgment to the subscriber station 5 that the request has been received and that no collision occurred with another subscriber station $5_B$-$5_N$ transmission. Once the acknowledgment has been sent, the network headend 20 schedules the request and forwards a message to the subscriber station 20 granting a number of slots in which to send the information.

Figure 2:
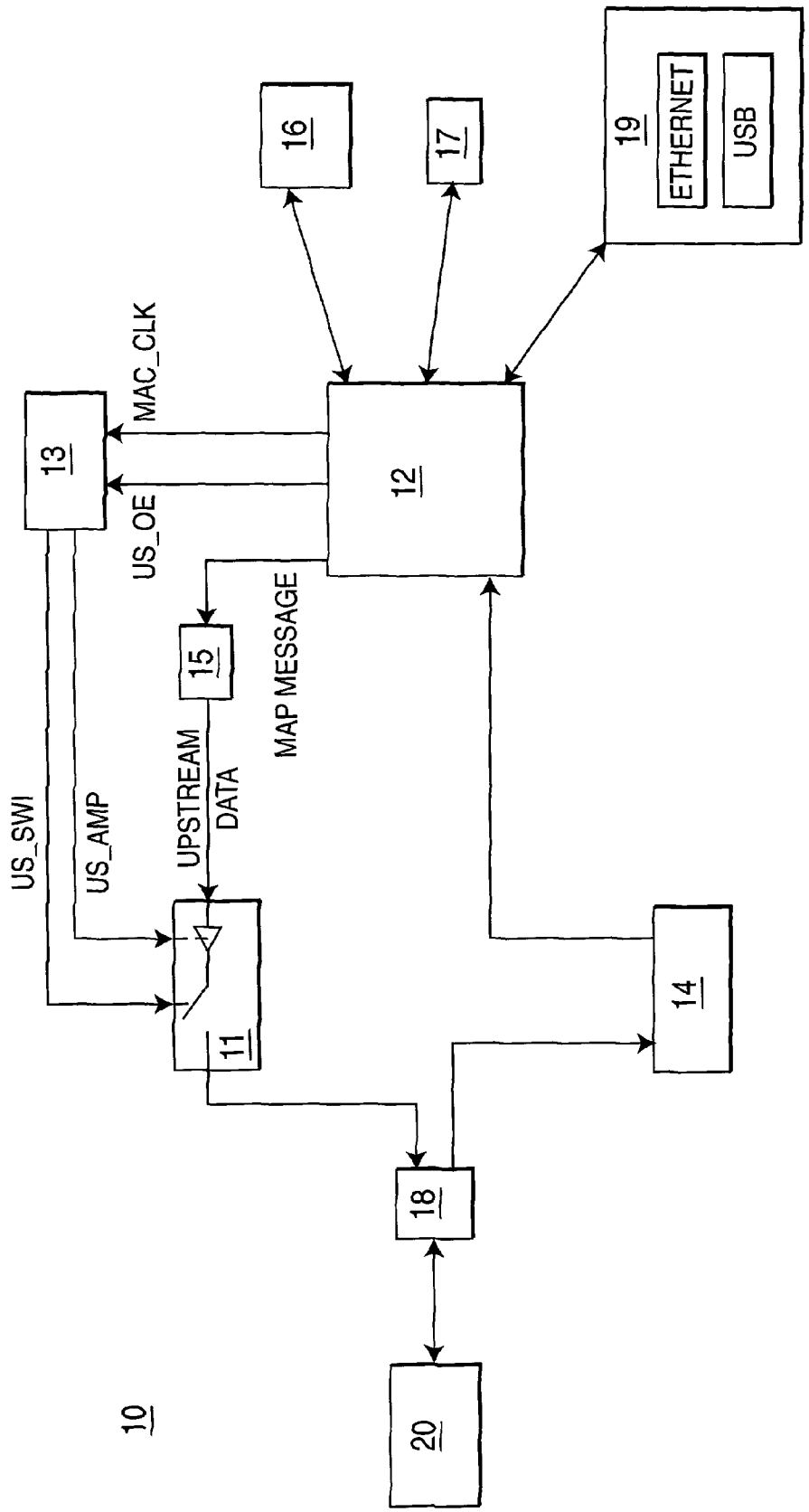
FIG. 2 is a block diagram of a cable modem in accordance with the preferred embodiment of the present invention.

The MAC protocol described above is conducted by a MAC chip 12 within the cable modem 10 of a subscriber station $5_A \ldots 5_N$. Illustrated in FIG. 2 is a block diagram of a cable modem 10 in accordance with the preferred embodiment of the present invention. The cable modem 10 comprises a MAC chip 12, an upstream signal processor 15, a downstream signal processor 14, an RF tuner 18, an upstream amplifier 11, a complex programmable logic device (CPLD) 13, a general purpose processor 16, memory 17, and peripheral interfaces 19 such as Ethernet, Universal Serial Bust (USB) or PCI (for plug-in adapters).

The information signal from the network headend 20 is sent to the cable modem 10. The RF tuner 18 tunes the information signal from the network headend 20 and passes it to the downstream signal processor 14.

As those skilled in the art should know, the downstream signal processor 14 performs the MPEG header extraction, DOCSIS header extraction, header checksum, and CPR validation. Once this information is extracted, the MAC chip 12 processes the allocation message from the network headend 20 and determines when upstream data should be sent.

The MAC chip 12 handles time critical mechanisms, such as synchronization and bandwidth allocation, MAP messages, and delivers other MAC messages to the peripheral interfaces 19. The MAC chip 12 is coupled to the CPLD 13, the general processor 16, the peripheral interfaces 19, and the upstream signal processor 15. The MAP messages sent from the network headend 20 are sent directly to the upstream signal processor 15. The upstream signal processor 15 translates the upstream allocation information from the MAP message, extracted from the MAC chip 12, and requests and conducts data transmission at the allocated time.

Along with allocation information being sent to the upstream signal processor 15, the MAC chip 12 also controls the upstream power control system. As stated above, prior art cable modems generally do not have strict power consumption contraints and therefore do not attempt to utilize any type of power control. According to the preferred embodiment of the present invention, the MAC chip 12 outputs an upstream power control signal US_OE. The upstream power control signal US_OE is asserted during upstream data transmission to control the operation of the upstream power amplifier.

The MAC chip 12 outputs the upstream power control signal US_OE and the MAC chip 12 clock signal MAC_CLK to the CPLD 13. The CPLD 13 is coupled to the MAC chip 12 and the upstream amplifier 11. The purpose of the CPLD 13 is to generate the upstream amplifier control signal US_AMP and the upstream amplifier switching signal US_Switch, (generated from the MAC chip 12 upstream power control signal US_OE). The upstream amplifier control signal US_AMP, when asserted, signals the upstream amplifier 11 to power on; and when asserted, signals the upstream amplifier 11 to power off. The upstream amplifier switching signal US_Swi controls the flow of upstream data through the upstream amplifier 11. When the upstream amplifier switching signal US_Swi is negated, the upstream amplifier 11 is able to pass the upstream data to the upstream signal processor 15 and on to the RF tuner 18 where it is then sent to the network headend 20. When the upstream amplifier switching signal US_Swi is asserted, the upstream data is disconnected from being output to the network headend 20 by the upstream amplifier 11.

Figure 5:
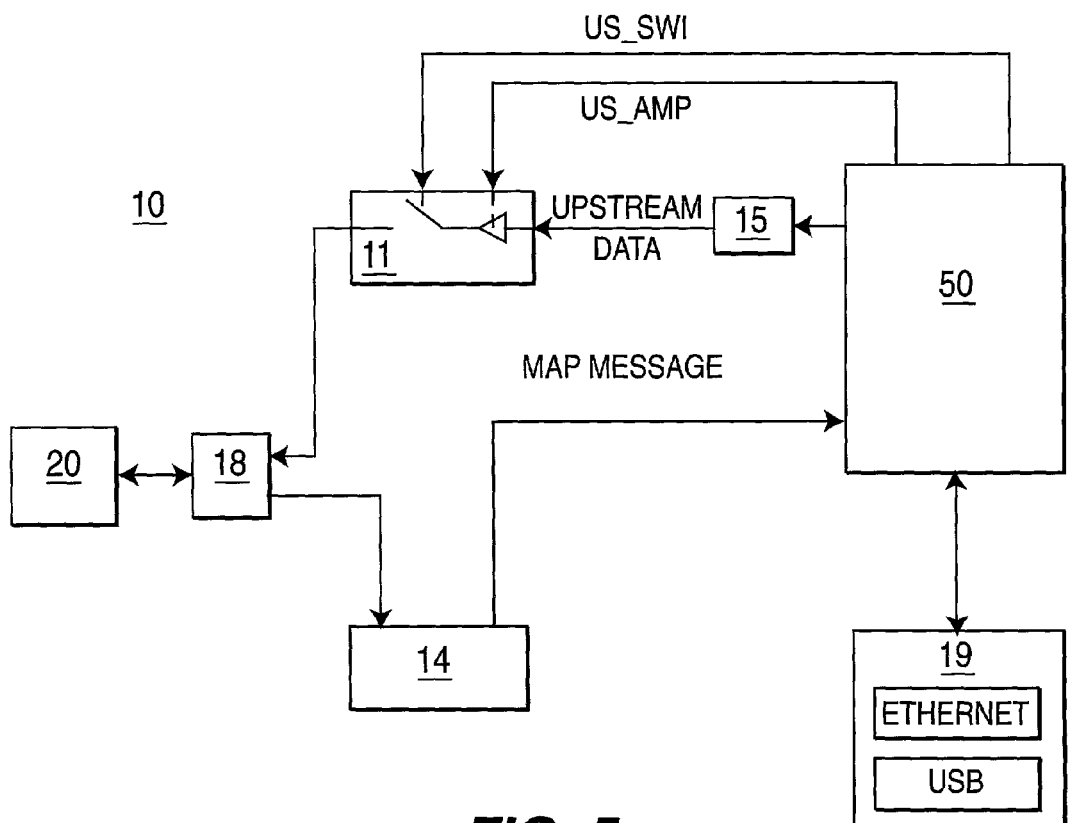
FIG. 5 is a block diagram of the preferred embodiment incorporating an ASIC.

It should be apparent to those skilled in the art that the MAC chip 12, CPLD 13, the general purpose processor 16 and memory 17 could be integrated into a single ASIC 50, which generates the necessary power control signals. (See FIG. 5).

Figure 3:
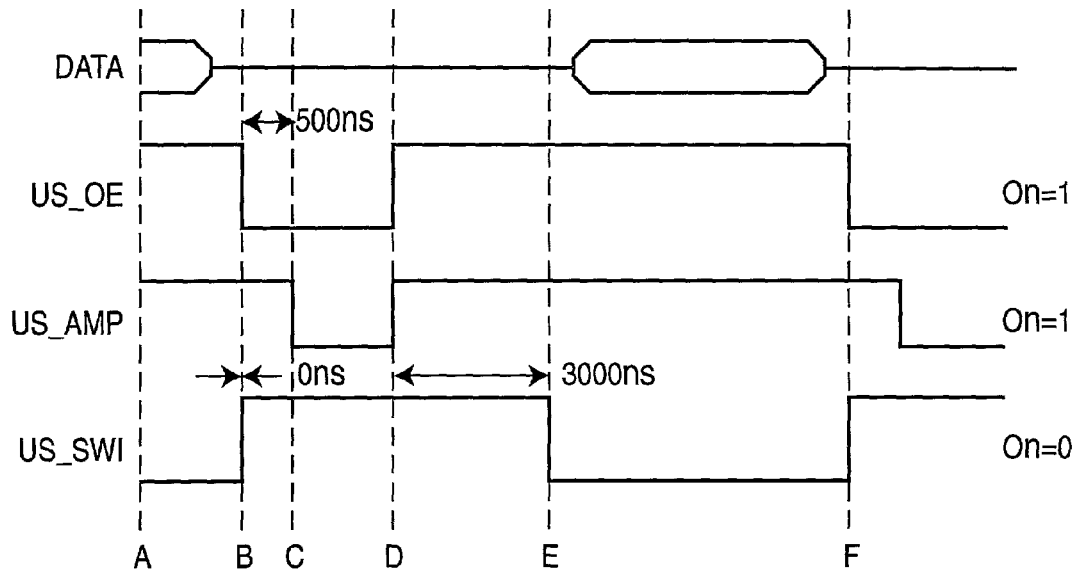
FIG. 3 is a timing diagram of the upstream power control in accordance with the preferred embodiment of the present invention.

The timing of this upstream power control system is illustrated in FIG. 3. Shown at point A are the signals US_OE, US_AMP and US_Swi in their asserted position, indicating upstream data is being transmitted to the headend. At point B, US_OE switches to 0 indicating that data transmission has ceased. When US_OE goes to 0, US_Swi switches to 1, disconnecting the upstream amplifier 11 from the upstream signal processor 15. At point C US_AMP switches to 0 powering off the upstream amplifier 11. As shown at points B and C, the upstream amplifier switching signal US_Swi is turned off before the upstream amplifier 11 is signaled to power off. This timing scheme avoids truncating the data and reduces glitches on the upstream.

At point D, the power control signal switches US_OE to 1 indicating that upstream data transmission is approaching. At the same time, the upstream amplifier control signal US_AMP is asserted, powering on the upstream amplifier 11. At point E, the upstream amplifier switching signal US_Swi switches to 0, connecting the upstream amplifier 11 to the upstream signal processor 15 in order to transmit upstream data to the headend 20. As shown in points D and E, the upstream amplifier switching signal US_Swi is turned on after the upstream amplifier 11 is powered on, which ensures sufficient time for the amplifier 11 to stabilize.

Once the data has been transmitted, again at point F, the upstream power control signal US_OE switches to 0 and the upstream amplifier switching signal US_Swi switches to 1, indicating that data transmission has ended. After a predetermined amount of time, the upstream amplifier control signal US_AMP is negated, powering off the upstream amplifier 11.

Figure 4:
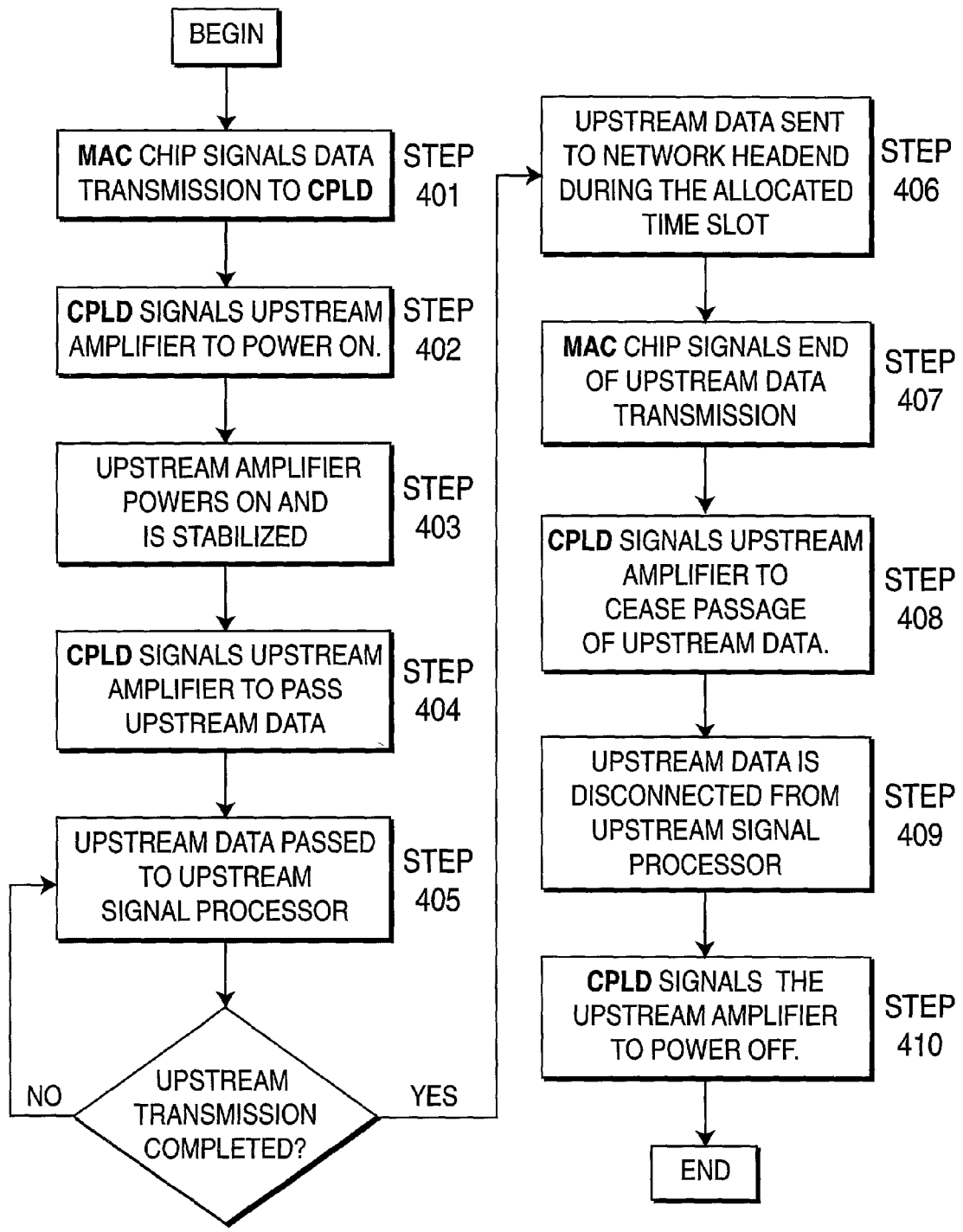
FIG. 4 is a flow diagram of the upstream power control in accordance with the preferred embodiment of the present invention.

A flow diagram of the upstream power control system is illustrated in FIG. 4. When the MAC chip 12 detects that the allocation time for upstream data transmission is approaching, the upstream power control signal US_OE is asserted, indicating data transmission (Step 401). Utilizing the upstream power control signal US_OE from the MAC chip 12, the CPLD 13 asserts upstream amplifier control signal US_AMP (Step 402), powering on the upstream amplifier 11 (Step 403). Once the upstream amplifier 11 is powered on and stabilized, the CPLD 13 then asserts upstream amplifier switching signal US_Swi (Step 404), which allows the upstream amplifier 11 to pass the upstream data to the upstream signal processor 15 (Step 405) and up to the network headend 20 (Step 406).

When the allotted time for transmission of upstream data, assigned by the network headend 20 is used up, or the upstream data has been transmitted to the network headend 20, the MAC chip 12 negates the upstream power control signal US_OE indicating that data transmission has ended (Step 407). The CPLD 13 negates the upstream amplifier switching signal US_Swi (Step 408), disconnecting the upstream data from being output by the upstream amplifier 11 (Step 409). After a predetermined time period, the CPLD 13 negates the upstream amplifier control signal US_AMP, powering off the upstream amplifier (Step 410).

The upstream power control system of the cable modem 10 as described in the preferred embodiment of the present invention reduces the amount of power consumption by the cable modem 10. This reduction in power consumption is accomplished by powering on the upstream amplifier 11 during upstream data transmission and powering off the upstream amplifier 11 when upstream data transmission is ended.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A cable modem for receiving down stream and transmitting upstream communication signals to a cable network having an upstream power control system for controlling power consumption comprising;

a MAC chip for synchronizing upstream communication signals, and outputting an upstream control signal;

an upstream amplifier for receiving synchronized upstream communication signals from said MAC chip; and a complex programmable logic device (CPLD), coupled to said MAC chip and said upstream amplifier, which controls said upstream amplifier in response to the upstream control signal from said MAC chip, such that said CPLD causes said upstream amplifier to power on during transmission of upstream signals and power off when not transmitting said upstream signals, thereby reducing power consumption of the cable modem, wherein said CPLD generates an amplifier switch signal for connecting said upstream amplifier to an RF tuner for transmission of said upstream data signal to said headend, and an amplifier control signal for powering on and off said upstream amplifier, and wherein said CPLD generates said amplifier switch signal after said amplifier control signal is generated, thereby stabilizing said upstream amplifier.

2. The cable modem according to claim 1 wherein said CPLD continues generating said amplifier control signal after said CPLD ceases to generate said amplifier switch signal, thereby truncation of said upstream data signal is avoided.

3. A method of upstream power control for a cable modem comprising the steps of:

selectively generating an upstream unamplified communication signal along with a control signal;

controlling an upstream amplifier in response to said control signal such that said upstream amplifier is powered on to amplify said unamplified communication signal when generated and powered off when no upstream communication signal is being generated, thereby reducing power consumption of said cable modem; and generating an amplifier control signal and amplifier switch signal responsive to said control signal, wherein said amplifier switch signal is generated after said amplifier control signal.

4. The method according to claim 3 wherein said amplifier control signal continues to be generated after said amplifier switch signal ceases to be generated.

5. A cable modem for receiving downstream and transmitting upstream communication signals to a cable network having an upstream power control system comprising:

a control circuit for synchronizing upstream communication with a cable network headend, wherein a control signal is generated; and an upstream amplifier for receiving synchronized upstream communication signals from said control circuit; said control signal causing said upstream amplifier to power on during transmission of said upstream data signals and power of when not transmitting said upstream data signals, thereby reducing said power consumption of said cable modem, wherein said control signal comprises an amplifier control signal for controlling said upstream amplifier and an amplifier switch signal for connecting said upstream amplifier to an RF tuner for transmission of said upstream data signal to said network headend, and wherein said amplifier switch signal is generated after said amplifier control signal is generated, thereby stabilizing said upstream amplifier.

6. The cable modem according to claim 5 wherein said CPLD continues generating said amplifier control signal after said CPLD ceases to generate said amplifier switch signal, thereby truncation of said upstream data signal is avoided.

7. The system according to claim 5 wherein said control circuit comprises:

a MAC chip for synchronizing upstream communication signals, and outputting said upstream control signal; and a complex programmable logic device (CPLD), coupled to said MAC chip and said upstream amplifier, which controls said amplifier by generating said amplifier control signal and said amplifier switch signal in response to the upstream control signal from said MAC chip.

* * * * *